United States Patent
Hirota

(10) Patent No.: US 8,016,496 B2
(45) Date of Patent: Sep. 13, 2011

(54) IMAGING APPARATUS HAVING RETRACTABLE BARRIER ON AN IMAGING SIDE OF AN ELECTRICAL COMPONENT AND RETRACTION SPACE BELOW THE LENS

(75) Inventor: Norikazu Hirota, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 216 days.

(21) Appl. No.: 12/061,427

(22) Filed: Apr. 2, 2008

(65) Prior Publication Data

US 2008/0253759 A1 Oct. 16, 2008

(30) Foreign Application Priority Data

Apr. 13, 2007 (JP) ................. 2007-105441

(51) Int. Cl.
*G03B 17/00* (2006.01)
(52) U.S. Cl. ..................................... 396/448
(58) Field of Classification Search .................. 396/448
See application file for complete search history.

(56) References Cited

U.S. PATENT DOCUMENTS

| | | | | |
|---|---|---|---|---|
| 5,541,696 A * | 7/1996 | Bittner | .................... | 396/448 |
| 5,740,480 A * | 4/1998 | Kuhn et al. | ................ | 396/177 |
| 6,135,652 A * | 10/2000 | Owashi et al. | .............. | 396/349 |
| 6,247,855 B1 * | 6/2001 | Motohashi et al. | ......... | 396/448 |
| 6,442,348 B1 * | 8/2002 | Yamada | .................... | 396/281 |
| 6,515,705 B1 * | 2/2003 | Fumio et al. | ................ | 348/375 |
| 6,574,431 B2 * | 6/2003 | Mikami et al. | .................. | 396/6 |
| 6,704,506 B2 * | 3/2004 | Sasagawa | ...................... | 396/88 |
| 6,735,381 B2 * | 5/2004 | Litzenberger | .................... | 396/6 |
| 6,813,444 B2 * | 11/2004 | Inazuka et al. | ................ | 396/267 |
| 6,926,453 B2 * | 8/2005 | Hisamatsu | .................... | 396/349 |
| 7,092,624 B2 * | 8/2006 | Perry et al. | ........................ | 396/6 |
| 2002/0089601 A1 | 7/2002 | Fumio | | |
| 2004/0263666 A1 | 12/2004 | Tsuji et al. | | |
| 2006/0224427 A1 | 10/2006 | Salmon | | |
| 2009/0034958 A1 * | 2/2009 | Dierenbach | ................ | 396/199 |

FOREIGN PATENT DOCUMENTS

| | | |
|---|---|---|
| CN | 1540433 A | 10/2004 |
| CN | 2667526 Y | 12/2004 |
| JP | 11-064929 A | 3/1999 |
| JP | 11-258657 A | 9/1999 |
| JP | 11-271839 A | 10/1999 |
| JP | 2000-147600 A | 5/2000 |
| JP | 2004-173100 A | 6/2004 |
| JP | 2004-341223 A | 12/2004 |
| JP | 2005-208122 A | 8/2005 |
| JP | 2006-047588 A | 2/2006 |
| JP | 2006-171604 A | 6/2006 |

* cited by examiner

*Primary Examiner* — W. B. Perkey
*Assistant Examiner* — Bret Adams
(74) *Attorney, Agent, or Firm* — Canon USA, Inc. IP Division

(57) ABSTRACT

A lens barrier is arranged on a front face of a photographic lens. The lens barrier can move into a lens barrier retraction space at an angle which is inclined with respect to the optical axis of the photographic lens. The lens barrier retraction space is provided under the photographic lens. As a result, a remote control light receiving element and a microphone can be arranged on an object side of the lens barrier retraction space, whereby the object side surface area of a camera body can be made smaller due to the configuration of the lens barrier.

9 Claims, 10 Drawing Sheets

FIG. 6A
FIG. 6B
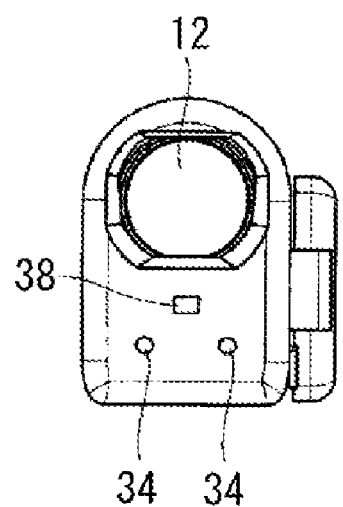
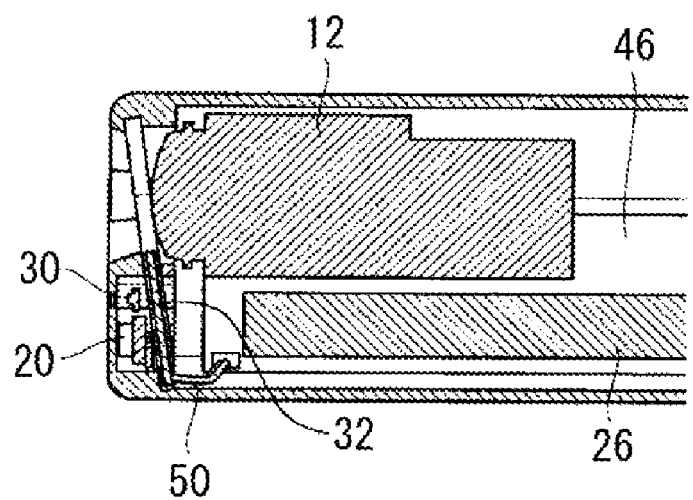

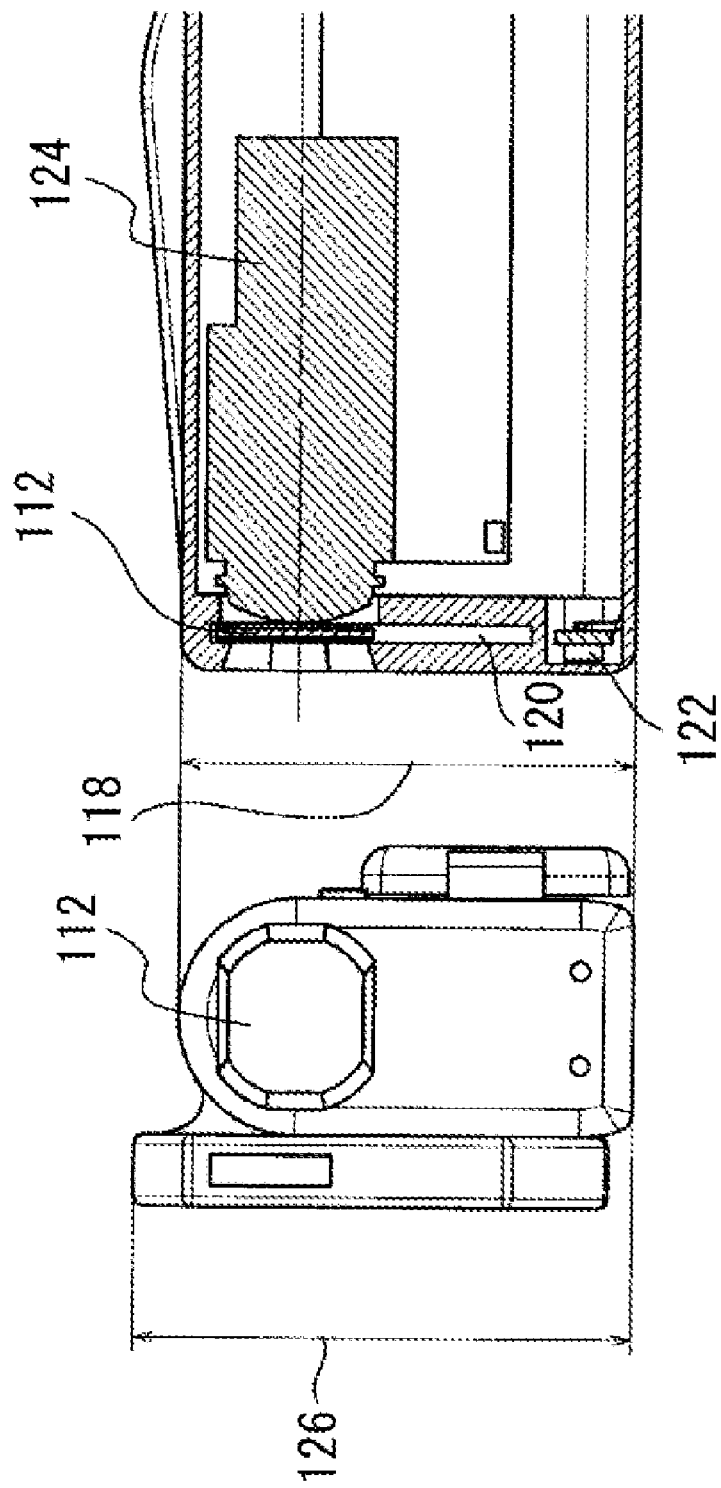

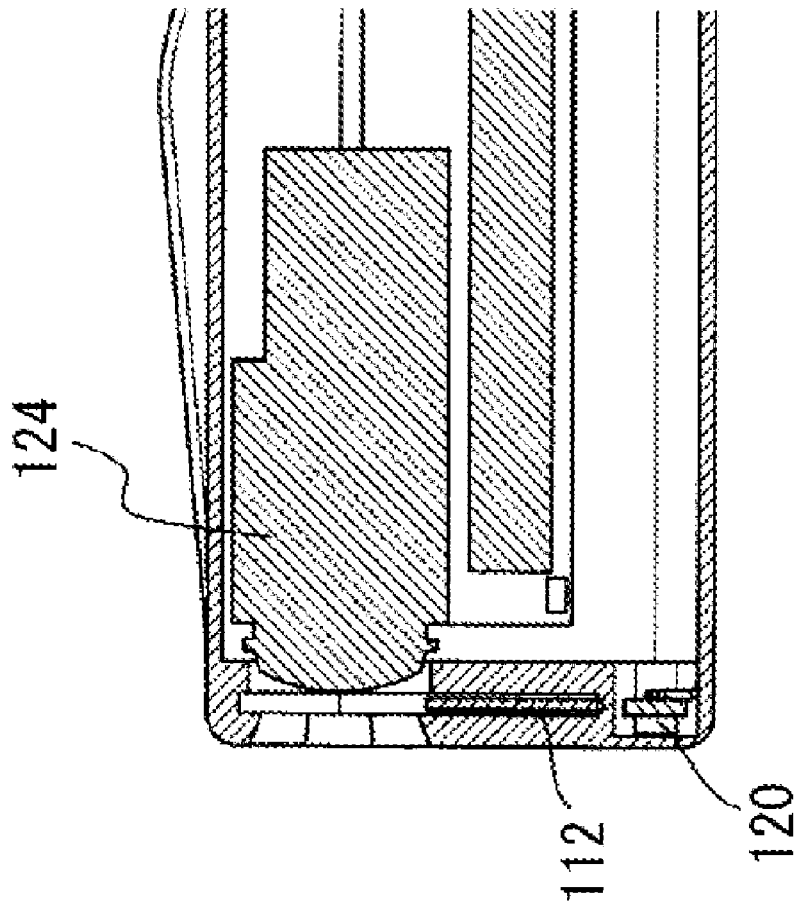
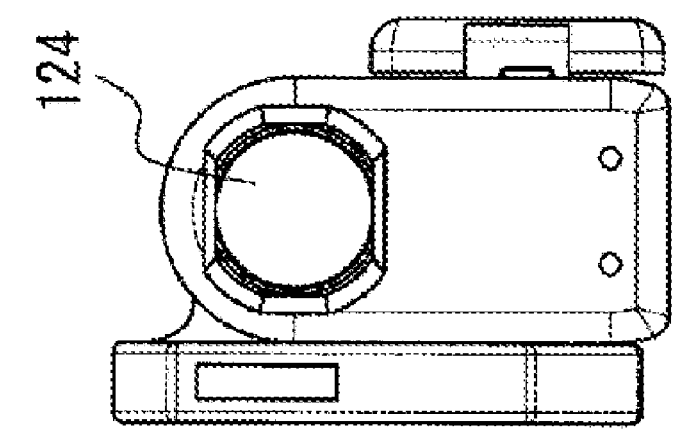
FIG. 10A (PRIOR ART)
FIG. 10B (PRIOR ART)

IMAGING APPARATUS HAVING RETRACTABLE BARRIER ON AN IMAGING SIDE OF AN ELECTRICAL COMPONENT AND RETRACTION SPACE BELOW THE LENS

BACKGROUND OF THE INVENTION

1. Field of the Invention

The present invention relates to an imaging apparatus including a photographic lens protection unit.

2. Description of the Related Art

For imaging apparatuses such as digital video cameras, digital cameras and the like, lens cap type protection units are used for protecting the photographic lens. Conventional lens cap type protection units attach a lens cap having an attachment structure to a filter screw thread on the object side of a front lens element of the photographic lens. Since the lens cap is detached when capturing an image, it has been proposed to link the lens cap to the grip belt of the imaging apparatus by a cord or the like to prevent the lens cap from being lost (Japanese Patent Application Laid-Open No. 11-271839).

Further, a structure has been commercially developed which provides a cover for the lens cap protection unit, a so-called "lens barrier", that when an image is not being captured is positioned on the object side of a front lens element of the photographic lens to protect the photographic lens, and when an image is being captured retracts from the object side of a front lens element of the photographic lens. As the lens barrier, there are a type where the user of the imaging apparatus moves the cover manually, and a type where the cover is moved electrically using a motor.

Lens barrier covers are typically one of two types: a rotating type which opens and shuts by rotating a plurality of blade members like a diaphragm; or a sliding type which operates by making about one or two plate-shaped members slide across. For sliding type lens barriers, two types are representative: barriers which are exposed to the front face of the device body and which form an exterior part (see Japanese Patent Application Laid-Open No. 2004-173100); and lens barriers built into the body which are arranged inside the exterior part of the device body and are only exposed to the outside at the photographic lens opening (see U.S. Patent Application Publication No. 2005/0094027). Since the latter type does not need to take up a large surface area on the exterior of the device front face, in recent years this type is used in many digital video cameras and digital still cameras.

However, for a lens barrier which is built into the body, when capturing an image, a plate-shaped member has to be stored in the body. Specifically, a space for housing the plate-shaped member of the lens barrier has to be provided inside the imaging apparatus. Further, the plate-shaped member of the lens barrier needs to be arranged on the object side of the front lens element of the photographic lens.

For an imaging apparatus, there are many elements which need to be arranged on the object side, such as a flash unit, a microphone, a remote control light receiving element, and the like. Conventionally, the flash unit and the microphone have been arranged at a position which avoids the operating range of the plate-shaped member of the lens barrier. For example, in the ultra-small video camera discussed in U.S. Patent Application Publication No. 2005/0094027, the microphone is arranged on the upper face of the device to avoid the lens barrier built into the body and to avoid the front face which is used for holding the device by hand. With this structure, the microphone faces out from the upper face rather than from the object side, and thus this structure has the drawback that sound from the object side cannot be efficiently collected. Arranging the microphone on the face of the object side while avoiding the lens barrier built into the body inevitably leads to an increase in the surface area of the object side of the imaging apparatus body.

FIG. 8 illustrates an external perspective view of a video camera mounted with a conventional lens barrier built into the camera body. FIGS. 9A and 9B illustrate a frontal view and a mid-section cross sectional view of a state where the lens is protected by a lens barrier. FIGS. 10A and 10B illustrate a frontal view and a mid-section cross sectional view of a lens exposed state.

On a conventional video camera 110, the lens barrier 112 can be made to slide up and down by manually moving the barrier knob 114 up and down. The lens barrier 112 protects the photographic lens 124 when an image is not being captured, and exposes the photographic lens 124 to the object side when an image is captured. When the photographic lens 124 is exposed to the object side, the lens barrier 112 is retracted into the lens barrier retraction space 120 illustrated in FIG. 9B.

The microphone 122 for collecting the sounds of an object is arranged on a lower side of the lens barrier retraction space 120. The front face of the video camera 110, specifically, the external surface area when viewed from the object face side, needs to be equal to or greater than the sum of the surface area of the lens barrier 112, the surface area of the lens barrier retraction space 120, and the surface area of the microphone 122.

Further, like in this conventional example, when the microphone 122 is arranged on a lower side of the lens barrier retraction space 120, the height 118 of the video camera lens barrel portion increases.

If a medium that is quite large, such as a magnetic tape or an optical disk, is used as the recording medium of the recording unit 116, the height of the lens barrel portion is not often viewed as a problem.

However, in recent years, smaller recording media, such as hard disks or memory cards, have become more popular as the recording medium used in video cameras. This trend towards smaller recording media means that the object side surface area of the device body, specifically, the device itself, can be made smaller. From the aspects of both portability and exterior design, it is becoming necessary to house the lens barrier so that the object side surface area of the imaging apparatus becomes smaller.

SUMMARY OF THE INVENTION

The present invention is directed to an imaging apparatus which is smaller yet does not have an inferior exterior design.

According to an aspect of the present invention, an imaging apparatus includes a photographic lens, and a photographic lens protection unit comprising a barrier which is slideably moveable between a lens protecting position for protecting the photographic lens and a lens exposing position for exposing the photographic lens in a state ready for image capture, wherein the lens protecting position is located closer to an object side of the imaging apparatus than the lens exposing position.

According to another aspect of the invention, an imaging apparatus includes a barrier that is slideably moveable between the lens protecting position and the lens exposing position in a direction which makes an oblique angle to an optical axis of the photographic lens and an oblique angle to the plane perpendicular to the optical axis.

According to yet another aspect of the present invention, an imaging apparatus includes an electrical component arranged on an object side of the imaging apparatus, wherein the photographic lens protection unit, when located in the lens exposing position, is located at the rear side of the electrical component opposite the object side of the electrical component.

According to exemplary embodiments of the present invention, by arranging the photographic lens protection unit in the manner described above, and making the photographic lens protection unit movable, the surface area of the object face side of the device body can be reduced. As a result, the size of the device itself can be made smaller, thereby improving portability and the degree of freedom in exterior design.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B are respectively a frontal view and a mid-section cross sectional view of the digital video camera in a lens exposed state.

FIGS. 9A and 9B are respectively a frontal view and a mid-section cross sectional view of a conventional video camera in a lens protected state.

FIGS. 10A and 10B are respectively a frontal view and a mid-section cross sectional view of a conventional video camera in a lens exposed state.

DETAILED DESCRIPTION OF THE EMBODIMENTS

Various exemplary embodiments, features, and aspects of the invention will be described in detail below with reference to the drawings.

First Exemplary Embodiment

Figure 1:
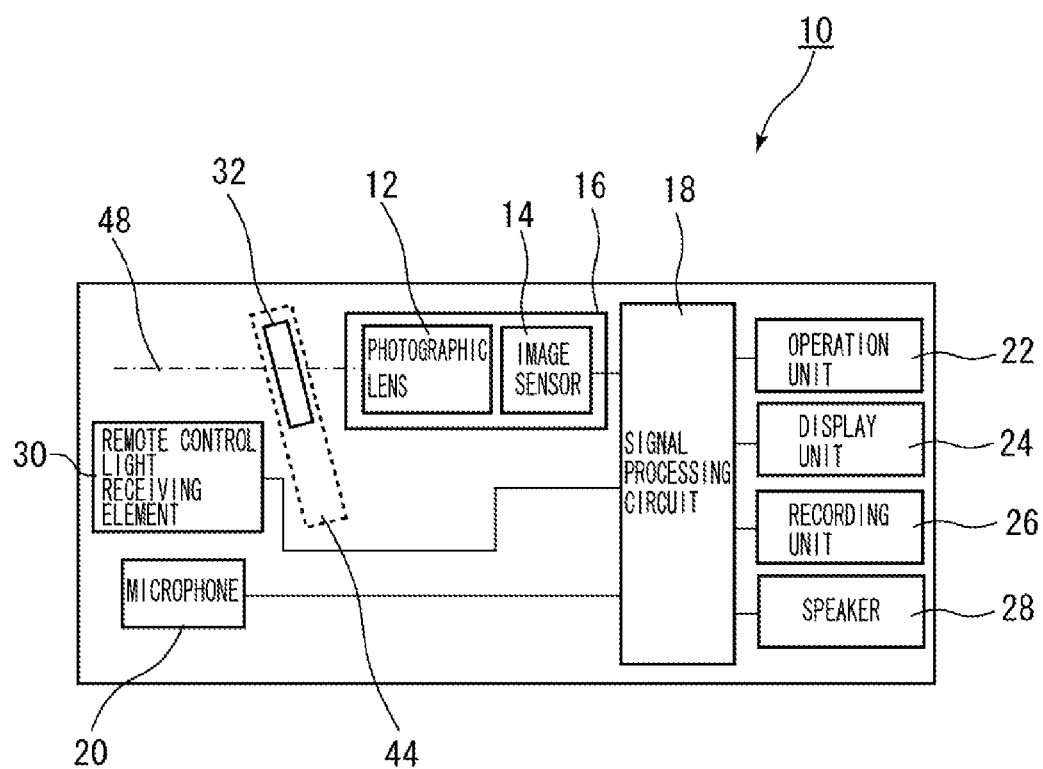
FIG. 1 is a block diagram illustrating the structure of a digital video camera according to the exemplary embodiments of the present invention.

FIG. 1 illustrates the structure of a digital video camera 10 according to exemplary embodiments of the present invention.

The digital video camera 10 can record and playback video and audio of an object. First, the video and audio recording operation will be described. The photographic lens 12 forms an optical image of the object on an image sensor 14. An opening for exposing the photographic lens 12 is provided on a casing which serves as an exterior part of the camera 10. The image sensor 14 is configured from, for example, charge coupled device (CCD) image sensors or complementary metal-oxide semiconductor (CMOS) image sensors. The image sensor 14 converts optical images of the object to an electrical video signal. The photographic lens 12 and the image sensor 14 form a camera unit 16.

A signal processing circuit 18 converts the video signal from the image sensor 14 into a predetermined format, and feeds the converted signal to a display unit 24 and a recording unit 26. The display unit 24 is formed from a liquid crystal display (LCD) or an organic electroluminescence (EL) display device. The display unit 24 displays the video signal from the signal processing circuit 18. The recording unit 26 records the video signal from the signal processing circuit 18 in a not-shown recording medium. The recording medium may be, for example, a magnetic tape, an optical disk, a magnetic disk, a semiconductor memory or the like.

A microphone (monochrome microphone or a stereo microphone unit) 20 captures audio of the object for conversion to an electrical signal. The signal processing circuit 18 converts the audio signal from the microphone 20 into a predetermined format. If audio output is required, the signal processing circuit 18 feeds the audio signal to a speaker 28. For recording, the signal processing circuit 18 feeds the audio signal to recording unit 26. The recording unit 26 records the audio signal from the signal processing circuit 18 together with the above-described video signal in the recording medium.

The video and audio playback operation will now be described. The video and audio recorded in the recording unit 26 are played back and fed to the signal processing circuit 18. The signal processing circuit 18 feeds the playback video signal from the recording unit 26 to the display unit 24, and the playback audio signal from the recording unit 26 to the speaker 28. The playback video is displayed on the screen of the display unit 24, and the playback audio is output from the speaker 28.

Using an operation unit 22, a user instructs the digital video camera 10 to carry out this series of recording and playback operations. The operation unit 22 is configured from a switch, a dial, a touch panel, a potentiometer or the like. In addition, a control signal can be sent from a remote control device by infrared rays to a remote control light receiving element 30 to operate the digital video camera 10. A transmission unit using means other than infrared rays may also be employed.

Figure 2:
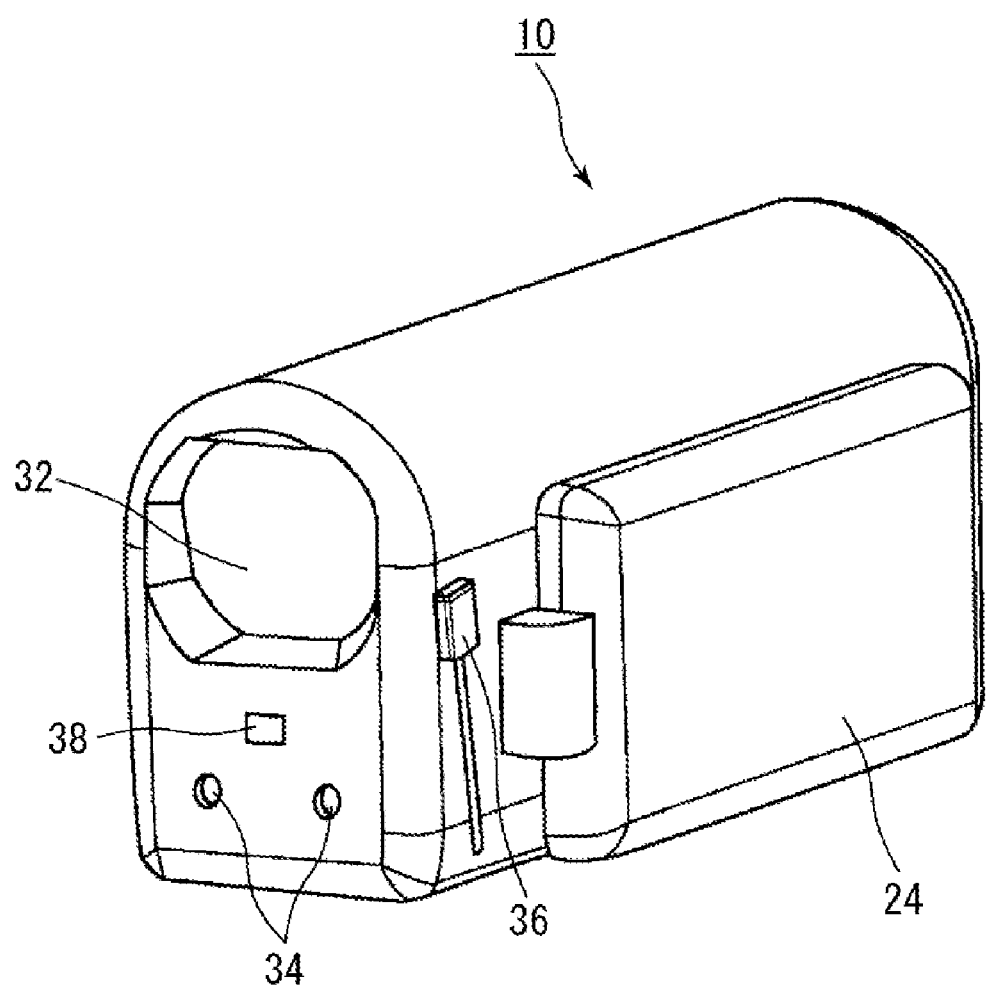
FIG. 2 is an external perspective view of the digital video camera.
Figure 3:
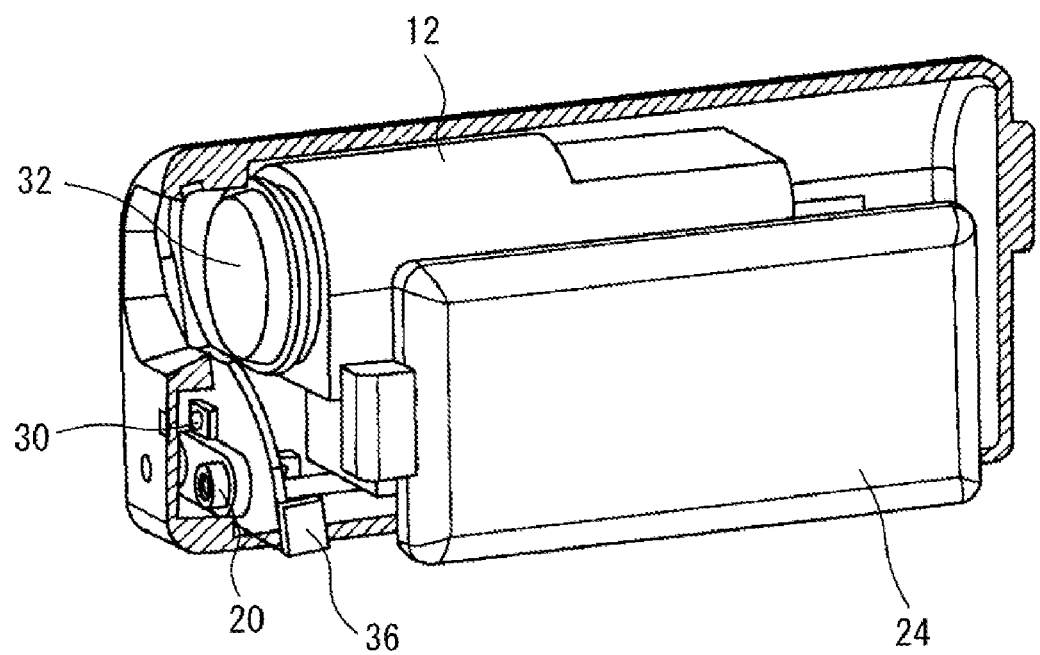
FIG. 3 is a perspective view of the internal mechanisms of the digital video camera.
Figure 4:
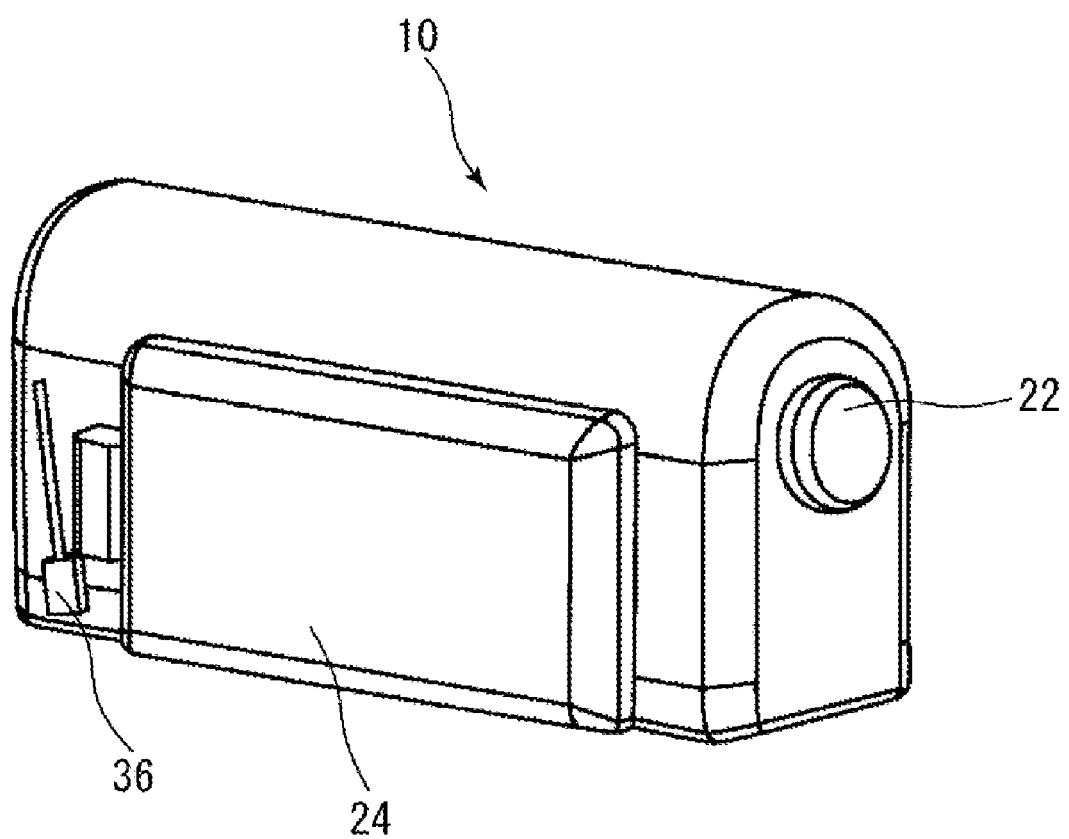
FIG. 4 is an external perspective view shown from the rear face of the digital video camera.

FIG. 2 illustrates an external perspective view of the digital video camera 10 in a lens protected state in which the photographic lens 12 is protected by a lens barrier 32. FIG. 3 illustrates the internal mechanisms of the digital video camera 10 in a lens exposed state in which the photographic lens 12 is exposed to the object side. In a lens protected state, the lens barrier 32 shields the opening exposing the photographic lens 12 to the object side, and in a lens exposed state, the lens barrier 32 retracts to a position which does not shield this opening. The face on the object side where the photographic lens 12 is exposed is termed the "front face" of the digital video camera 10, and as seen from the front face, the right side is termed the "right side face", the left side is termed the "left side face", the upper side is termed the "upper face", and the lower side is termed the "lower face". Further, the face on the opposite side of the object side of the digital video camera 10 is termed the "rear face". FIG. 4 illustrates an external perspective view looking down from the rear face side of the digital video camera 10.

The lens barrier 32 is integrally formed with a barrier knob 36. By moving the barrier knob 36 up and down, a user of the digital video camera 10 moves the lens barrier 32 between a position shielding or protecting the photographic lens 12 (lens protecting position) and a position exposing the photographic lens 12 (lens exposing position). The lens barrier 32 is formed, for example, by an opaque plastic plate or a metal plate. As illustrated in FIG. 2, the barrier knob 36 is revealed on the right side face of the digital video camera 10. A system in which the user moves the lens barrier 32 by moving the barrier knob 36 up and down by hand is a so-called manual lens barrier.

The display unit 24 is arranged on the right side face of the digital video camera 10, and is movably configured with respect to the digital video camera 10 by a hinge or the like. A microphone opening 34 is arranged on the front face of the digital video camera 10. The microphone 20 is arranged inside the microphone opening 34. Sound entering from the microphone opening 34 is input into the microphone 20. A remote control light receiving window 38 is arranged on the front face of the digital video camera 10. The remote control light receiving element 30 is arranged on an inner side of the remote control light receiving window 38.

As illustrated in FIG. 4, the operation unit 22 is arranged at the rear face of the digital video camera 10. As described above, the operation unit 22 is configured from a switch, a dial, a touch panel, a volume control or the like.

Figures 5A, 5B:
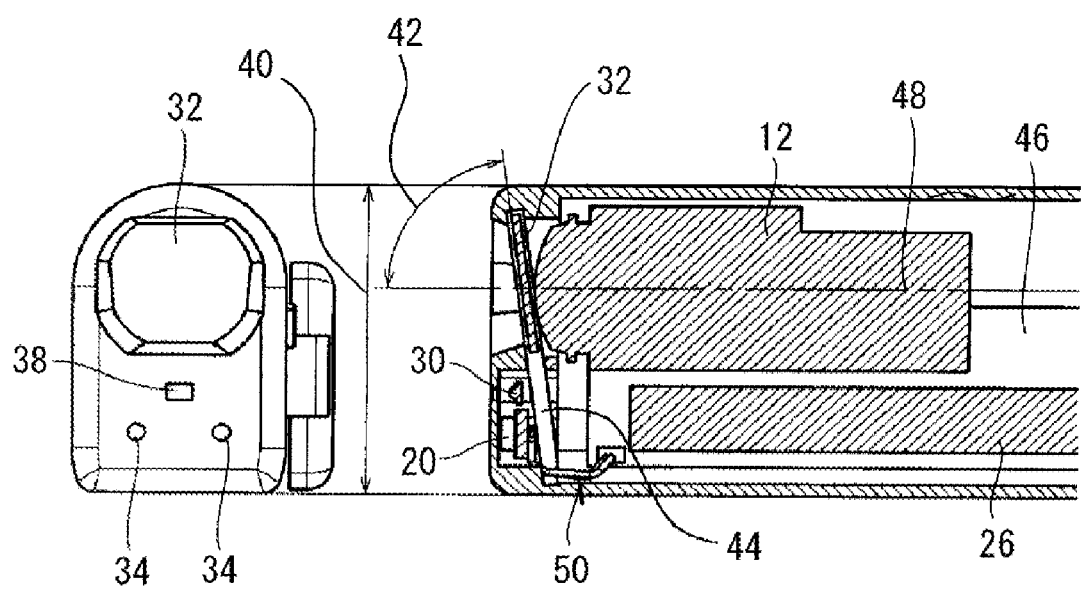
FIGS. 5A and 5B are respectively a frontal view and a mid-section cross sectional view of the digital video camera in a lens protected state.

The internal mechanisms of the digital video camera 10 will now be described. FIG. 5A illustrates a frontal view of the digital video camera 10 in a lens protected state, and FIG. 5B illustrates a mid-section cross sectional view corresponding to FIG. 5A. FIG. 6A illustrates a frontal view of the digital video camera 10 in a lens exposed state, and FIG. 6B illustrates a mid-section cross sectional view corresponding to FIG. 6A.

As illustrated in FIG. 5B, the lens barrier 32 protects the front lens element of the photographic lens 12 by being located on the object side of the photographic lens 12. The lens barrier 32 is slideably moveable along a track inclined at a prescribed oblique angle 42 with respect to the optical axis 48 of the photographic lens 12. The prescribed angle is also inclined obliquely with respect to the plane perpendicular to the optical axis 48. This inclined angle 42 is determined by the respective sizes of the digital video camera 10, the photographic lens 12, and the microphone 20. In this exemplary embodiment, the angle 42 is about 82 degrees (or 98 degrees) to the optical axis, although the present invention is not limited to this angle. By inclining the slide direction of the lens barrier 32 with respect to the optical axis 48 in this manner, the size of the device in the direction orthogonal to the optical axis direction of the device body can be made smaller than that when the direction is perpendicular to the optical axis 48 direction.

A lens barrier retraction space 44, that is, a position (lens exposing position) into which the lens barrier 32 retracts for exposing the photographic lens 12, is provided on a lower side of the photographic lens 12. Further, the microphone 20 and the remote control light receiving element 30 are arranged on the object side of the lens barrier retraction space 44. The microphone 20 and the remote control light receiving element 30 are connected to a circuit board 46 by wiring 50. Compared with a conventional structure, wherein the microphone is arranged under the lens barrier retraction space, the total height 40 of the digital video camera 10 can be made smaller. In other words, in this embodiment an imaging apparatus 10 comprises: a photographic lens 12, 124; a photographic lens protection unit 32, 112 which moves between a lens protecting position for protecting the photographic lens 12, 124 and a lens exposing position for exposing the photographic lens 12, 124 in a state ready for capturing an image; and an electrical component arranged on a body object side, wherein the photographic lens protection unit 32, 112 reaches the lens exposing position by moving to a rear face side of the electrical component.

As illustrated in FIG. 6B, when the lens barrier 32 is retracted into the lens barrier retraction space 44, the photographic lens 12 is exposed to the object side. In this exposed state, the digital video camera 10 is in a state ready for image capture. Since the lens barrier 32 is located behind the rear face of the microphone 20, the lens barrier 32 has the effect of preventing the drive noises of the photographic lens 12 and the recording unit 26 of the digital video camera 10 from entering into the microphone 20, or at least attenuating the noises.

Figure 7A:
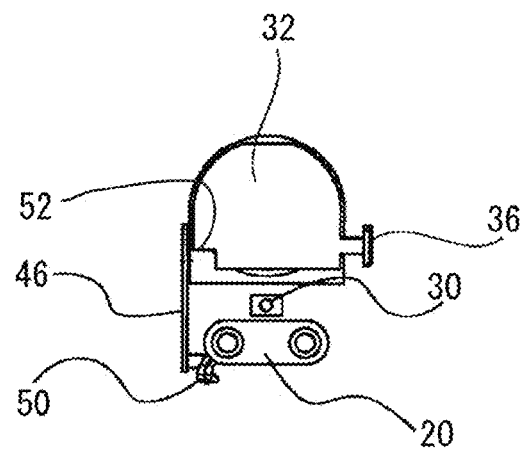
FIGS. 7A and 7B are views illustrating the positional relationship between the lens barrier and the photographic lens as seen from the front face.
Figure 7B:
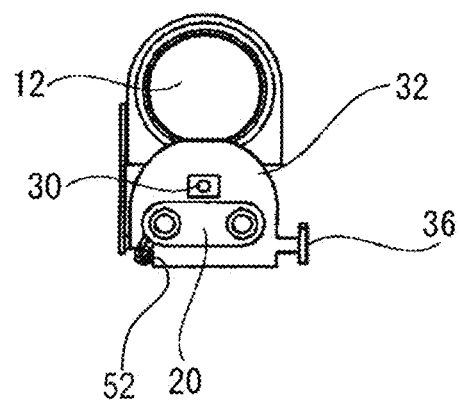
Figure 8:
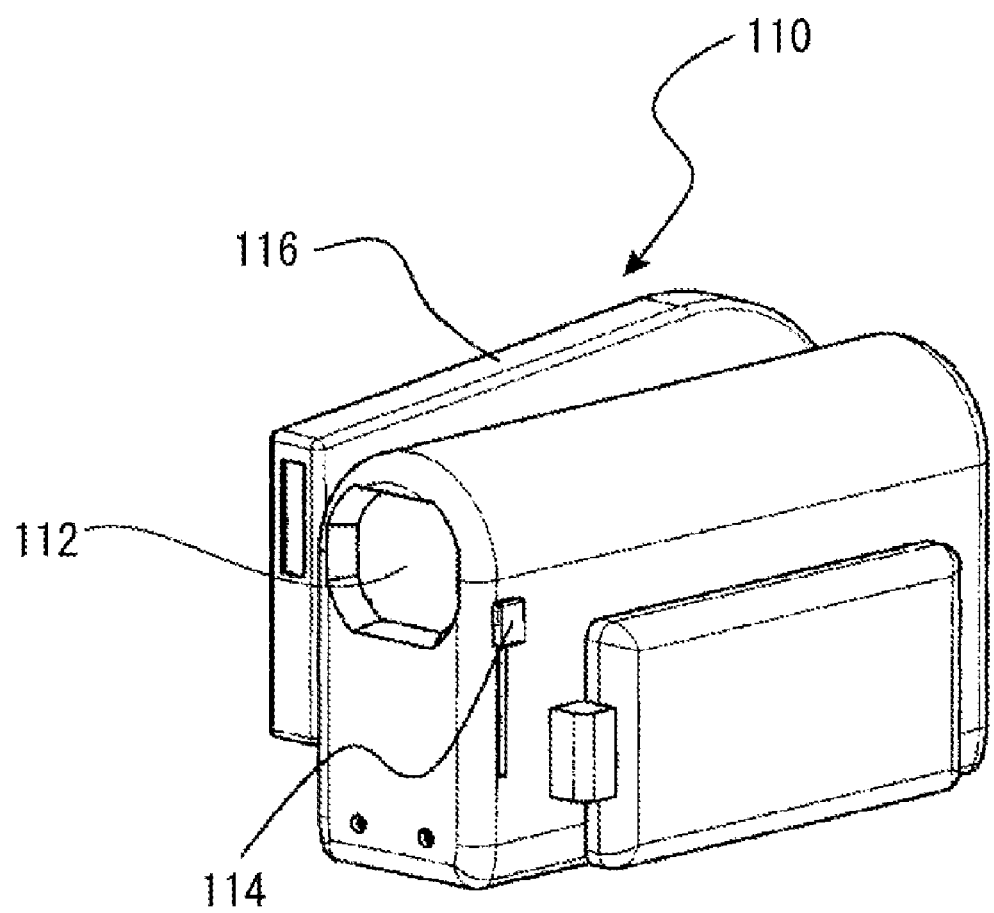
FIG. 8 is an external perspective view of a conventional digital video camera

FIGS. 7A and 7B illustrate the positional relationship between the lens barrier 32 and the microphone 20 as seen from the front face. In FIG. 7A, the lens barrier 32 is at a lens protecting position, and in FIG. 7B the lens barrier 32 is at a lens exposing position.

A notch 52 is provided in a lower corner of the lens barrier 32. This notch 52 serves as a path for the wiring 50 to pass through when the lens barrier 32 is at the lens exposing position, specifically, when retracted to the rear face side of the microphone 20 and the remote control light receiving element 30. The wiring 50 passes through the notch 52 and connects with the circuit board 46. If the notch 52 is not located on the lens barrier 32, the wiring 50 has to be passed through a position which avoids the lens barrier retraction space 44, whereby the total height and object side surface area of the digital video camera 10 body increase. While in this exemplary embodiment the wiring 50 was used as a signal line, a medium other than the wiring 50, such as a flexible circuit board or an optical fiber, may also be used.

By configuring the lens barrier in the above-described manner, the surface area of the object face side of the device body can be reduced while mounting the lens barrier 32 on the digital video camera 10 as a photographic lens protection unit. As a result, the size of the device itself can be made smaller, thereby improving portability and the degree of freedom in exterior design.

While a configuration was described for the lens barrier 32 in which a single plate member is moveable, the photographic lens protection unit according to the present invention is not limited to this embodiment. For example, it is also possible to employ a configuration in which plural lens barrier members are used as the photographic lens protection unit.

In the above-described exemplary embodiment, the slide direction of the lens barrier 32 was inclined with respect to the optical axis 48 of the photographic lens 12 and with respect to the plane perpendicular to the optical axis. However, the lens barrier 32 may also be moved between a lens protecting position close to the object and a lens exposing position further away from the object by rotating the lens barrier 32.

Although the lens barrier 32 itself is formed by an opaque plastic plate or a metal plate, the lens barrier may also be a transparent or light transmissive plate, or a colored plate, or a member having other optical properties.

In this exemplary embodiment, the microphone 20 and the remote control light receiving element 30 were arranged on the object side of the lens barrier retraction space 44. However, electrical components other than the microphone 20 and the remote control light receiving element 30 can be arranged on the object side of the lens barrier retraction space 44. Examples of such electrical components include a speaker as a sound generating unit, a range sensor for autofocus as a light receiving unit, a flash light generating member or a light emitting diode (LED) as a light generating unit, an infrared communication unit or a wireless local area network (LAN) module as a transmission/reception unit, a connector or a jack as an input/output unit, a barrier drive motor or a solenoid as a drive unit, a circuit board, a flexible circuit board as a signal line, a power coil, a flash capacitor, a resistance and the like.

While an exemplary embodiment was described as applied to a digital video camera, the present invention can be applied to digital still cameras, mobile phones, personal digital assistants and the like, so long as the imaging apparatus has a photographic lens.

While an exemplary embodiment was described having a manual lens barrier, the movement system of the lens barrier 32 is not limited to the configuration of the above-described exemplary embodiment. For example, a so-called electric lens barrier which uses a motor or a solenoid may also be employed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-105441 filed Apr. 13, 2007, which is hereby incorporated by reference herein in its entirety.

What is claimed is:

1. An imaging apparatus comprising:
a photographic lens;
an electrical component which is arranged on an object side of the imaging apparatus;
a barrier which is slidably moveable between a lens protecting position for protecting the photographic lens and a lens exposing position for exposing the photographic lens in a state ready for image capture; and
a barrier retraction space into which the barrier is retracted in case where the barrier is at the lens exposing position,
wherein the lens protecting position is located closer to an object side of the imaging apparatus than the lens exposing position,
wherein the barrier retraction space is located at the lower side of the photographic lens,
wherein the electrical component is arranged on the object side of the lens barrier retraction space, and wherein the electrical component and the barrier retraction space are arranged in a direction of an optical axis of the photographic lens.

2. The imaging apparatus according to claim 1, wherein the barrier is provided with a notch through which a signal line connecting with the electrical component passes through when the barrier is in the lens exposing position.

3. The imaging apparatus according to claim 1, wherein the electrical component comprises any of a sound collecting unit, a sound generating unit, a light receiving unit, a light generating unit, a transmission unit, a reception unit, an input unit, an output unit, a drive unit, a circuit board, a signal line, a coil, a capacitor and a resistance.

4. The imaging apparatus according to claim 1, further comprising:
a circuit board which is connected with the electrical component;
wherein a wiring connecting the electrical component and the circuit board runs across the barrier retraction space.

5. An imaging apparatus comprising:
an apparatus body having at least a front lens face side, a pair of vertically opposing sides and a bottom side;
a photographic lens mounted within the apparatus body, the lens having an object side facing outwards towards the front lens face side of the apparatus body and being positioned proximate thereto;
at least one electrical component rigidly fixed in a non-movable manner within the apparatus body, the at least one electrical component being positioned proximate the front lens face side of the apparatus body and below the lens object side of the lens as viewed from the front lens face side of the apparatus body, and positioned in front of the object side of the lens and below the lens as viewed from the pair of vertically opposing sides; and
a retractable barrier configured to cover the object side of the lens for protective purposes,
wherein within the apparatus body, a planar-shaped retraction space is defined to receive the retractable barrier when not positioned over the object side of the lens, the retraction space being located generally below the lens and in alignment with the object side of the lens as viewed from the pair of vertically opposing body sides, and directly behind and in close proximity to the at least one electrical component.

6. The imaging apparatus according to claim 5, wherein the barrier is provided with a notch through which a signal line connecting with the electrical component passes through when the barrier is in the lens exposing position.

7. The imaging apparatus according to claim 5, wherein the at least one electrical component includes at least one of a sound collecting unit, a sound generating unit, a light receiving unit, a light generating unit, a transmission unit, a reception unit, an input unit, an output unit, a drive unit, a circuit board, a signal line, a coil, a capacitor and a resistance.

8. The imaging apparatus according to claim 5, further comprising:
a circuit board which is connected with the at least one electrical component,
wherein a wiring connecting the at least electrical component and the circuit board runs across the retraction space.

9. The imaging apparatus according to claim 5,
wherein the photographic lens defines an optical axis,
wherein the planar-shaped retraction space is positioned at an inclined angle with respect to the optical axis of the lens as viewed from the pair of vertically opposing body sides such that when the retractable barrier is positioned over the object side of the photographic lens, the retractable barrier is closer to the front lens face side of the body, as compared to when retractable barrier is retracted and positioned within the retraction space behind the at least one electrical component.

* * * * *